United States Patent
Steinke et al.

[11] 3,973,763
[45] Aug. 10, 1976

[54] SYSTEM FOR MELTING METAL

[75] Inventors: Theodore D. Steinke, Pleasanton; Melvin A. Carter, Livermore, both of Calif.

[73] Assignee: Kaiser Aluminum & Chemical Corporation, Oakland, Calif.

[22] Filed: July 31, 1975

[21] Appl. No.: 600,546

Related U.S. Application Data

[62] Division of Ser. No. 445,721, Feb. 25, 1974, Pat. No. 3,935,003.

[52] U.S. Cl. .......................... 266/233; 266/237; 266/901
[51] Int. Cl.² .......................................... C22B 7/00
[58] Field of Search .................. 75/65 R, 68 R; 266/33 R, 33 S, 34 R, 34 A, 38, 200, 212, 233–237, 901

[56] References Cited
UNITED STATES PATENTS

| | | |
|---|---|---|
| 2,528,209 | 10/1950 | Bonsack et al. .................... 266/33 R |
| 3,276,758 | 10/1966 | Baker et al. ........................ 266/33 R |
| 3,759,635 | 9/1973 | Carter et al. ....................... 266/38 X |
| 3,770,420 | 11/1973 | Spear et al. ........................ 75/65 R |

Primary Examiner—Roy Lake
Assistant Examiner—Paul A. Bell
Attorney, Agent, or Firm—Paul E. Calrow; Edward J. Lynch

[57] ABSTRACT

This invention relates to an improved method of melting metal, particularly reactive metals, such as aluminum, wherein heated molten metal is withdrawn from a first chamber and a portion of the withdrawn molten metal is transferred to a second chamber containing solid metal so as to melt same and a portion of the withdrawn metal is recirculated to the first chamber so as to maintain melt homogenuity therein.

3 Claims, 2 Drawing Figures

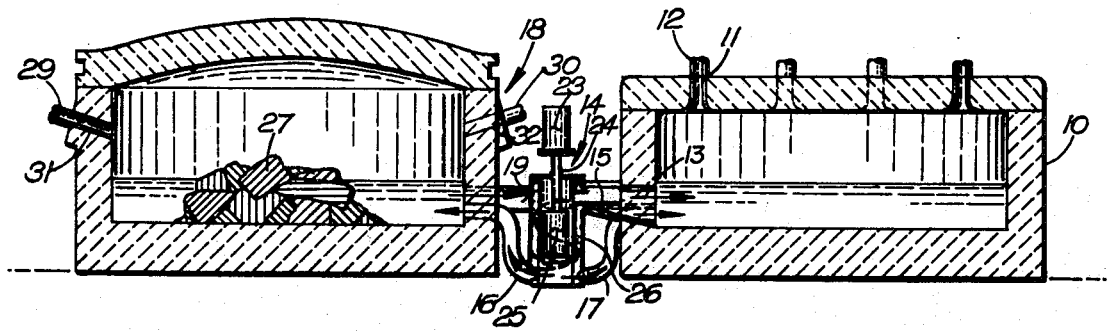

SYSTEM FOR MELTING METAL

This is a division of application Ser. No. 445,721, filed Feb. 25, 1974, Now U.S. Pat. No. 3,935,003.

BACKGROUND OF THE INVENTION

This invention relates to an improved furnace system for the melting of reactive metals, and, in particular, the melting of aluminum and aluminum alloys. Conventional practice in the melting of aluminum and aluminum alloys generally comprises placing solid metal to be melted, such as pigs, ingots, heavy scrap and the like, in a fuel-fired furnace containing a heel of molten metal. This melting practice was characterized by a low melt rate and extremely high melt losses due to metal oxidation. After the melting has been completed and alloying constituents added, the melt is stirred and then transported to a casting facility or to a holding furnace for subsequent casting. During the initial stages of this conventional practice, the melting rates are quite high due to the direct exposure of the solidified metal to the flame and combustion products, but concomitantly, the metal oxidation rate is quite high. It should be noted that metal lost to oxidation is probably the largest single cost in converting the solid metal to molten metal. When most of the solid metal is below the surface of the molten metal, the melt rate is drastically reduced due to the layer of oxide skim which inherently forms on the molten metal surface and the formation of a slushy aluminum at the solid-liquid metal interface both of which severely lower the heat transfer rate.

The metal products with a high surface-to-weight ratio which characteristically generate much oxide when melted by normal practice, such as thin sheet, foil, chips and the like, are usually melted in separate melting facilities, cast into pigs or sows, then remelted in the method described above.

The suggestion has been made (see, for example, U.S. Pat. No. 3,276,758 - Baker et al) to charge small chips and the like into a separate bay while pumping molten metal from a heating hearth to the separate bay to quickly submerge the chips and the like into the molten metal and melt the solid charge. The molten metal in the charging bay is returned to the heating hearth by gravity. However, one major problem with this system is the lack of a homogeneous melt. The melt in the heating hearth tends to stratify and frequently the cooler molten metal returned to the heating hearth will short circuit to the pump intake port.

Against this background, the present invention was developed.

DESCRIPTION OF THE DRAWINGS

FIGS. 1 and 2 are elevation and plan views in section of a system for practicing the present invention.

DESCRIPTION OF THE INVENTION

This invention is directed to a process for the melting of reactive metal products, such as aluminum and the like, which is characterized by substantially increased melt rate and a substantially lowered melt loss in comparison with conventional melting practices. Melt rate increases of up to 30% or more and melt loss reductions of up to 50% or more are found with the present invention. Moreover, the process has a substantially improved flexibility in that large metal pieces, such as pigs, ingot, thick plate and the like, as well as small metal pieces, such as sheet, foil, chips and the like, can be melted by the process, separately or together, with essentially no changes in the process.

In accordance with the present invention, a substantial heel or molten metal is maintained in a first chamber or heating hearth wherein heat is applied to the molten metal by suitable means, such as fuel burners and the like. The solid metal to be melted is placed in a second chamber or charging hearth. Molten metal is withdrawn from the heating hearth and a portion thereof is transferred to the charging hearth so as to melt the solid metal therein. In the process of the present invention, substantially all of the solid metal melting is caused by the contact of moving molten metal. The remaining portion of the withdrawn molten metal is recirculated back to the heating hearth so as to maintain the proper heat and compositional homogenuity within the melt. Molten metal in the charging hearth is returned by suitable means, usually by gravity, to the heating hearth. When melting and mixing are completed, the molten metal can then be transferred to a holding hearth for subsequent casting.

To obtain the improvements with the present invention, substantial quantities of metal must be transferred. Usually, molten metal amounting to at least 2%, preferably at least 10%, of the total metal in the system (both solid and liquid) must be transferred per minute from the heating hearth to the charging hearth. From about 5–50%, preferably about 5–30%, of the total molten metal withdrawn from the heating hearth should be recirculated to the heating hearth for mixing purposes. The temperature differential between the molten metal pumped to the charging hearth and the cooler molten metal returning to the heating hearth is at least 10°F, preferably from about 50°–100°F.

Because no metal is exposed directly to the flame or the combustion products thereof in the heating hearth, the oxide skim on top of the molten metal therein has different characteristics than that normally found in melting furnaces. The skim is much thinner and much denser and, moreover, it has a higher thermal conductivity. Although very little oxide skim is generated in the heating hearth, it is nonetheless preferred to control the thickness of this surface oxide to less than one-half inch, preferably one-tenth inch or less for high heat transfer from the burners to the molten metal thereunder. This is to be compared with conventional melting practices where the dross layer can range from two inches to two feet or more. The skim can be controlled to a certain extent by avoiding direct flame impingement upon the surface of the molten metal in the heating hearth. This minimizes any disturbance of the oxide layer which can accelerate oxide formation. By directing the flame parallel to the surface of the melt a suitable distance therefrom, the oxide surface will remain essentially undisturbed. A particularly suitable burner, Model DSF manufactured and sold by the Eclipse Company, produces a planar, high-area flame which is readily directed parallel to the surface of the molten metal. Another method of controlling the skim thickness is to control the burners to effect an essentially stoichiometric combustion and thereby prevent any excessive amounts of oxygen in the heating hearth which can also accelerate oxide formation.

The heat flux in the heating hearth of the present invention is quite high, but not as high as the heat flux characteristic of the conventional furnaces during the period when there is a direct flame impingement upon 24,000,000 BTU per hour into the melt. Burners in the charging hearth are maintained at low fire. At the start of the charging operations, the total pump output is increased to 20,000 pounds per minute with approximately 14,000 pounds per minute being transferred to the charging hearth and 6,000 per minute to the heating hearth. After about 20 minutes, the solid charge is approximately one-third melted and the molten metal in the heating hearth is approaching its minimum super heat of approximately 50°F, i.e., a temperature of about 1255°F. After approximately one hour, the solid charge is approximately two-thirds melted with the charging hearth approaching a flat bath condition. With this, the burners in the charging hearth are advanced to full fire to accelerate the heating in the charging hearth. After approximately 85 minutes, the metallic charge is completely melted and the system contains approximately 160,000 pounds of molten metal at a temperature of about 1255°F in the heating hearth and approximately 1210°F in the charging hearth. After about an hour and one-half, the metal approaches the desired temperature of about 1300°–1350°F and all burners in both hearths are reduced to a minimum fire. Approximately 80,000 pounds of molten metal is then transferred to a holding hearth. The temperature of the molten metal heel remaining in the system is heated to a temperature of about 1400°F and the system is ready for the next charge. Sampling and alloy corrections are made in the holding hearth, if needed. The time from the start of the operations to this point is approximately 2 hours and the system is ready for the next charge. Net melt loss in the above example is estimated at about 1% or less of the metal melted, whereas net melt losses in conventional melting furnaces can exceed 1.5% Melting rates in the above example are about 150 pounds/hr ft$^2$ of hearth area. A typical melting rate in conventional gas-fired furnaces would be about 60 pounds/hr ft$^2$ of hearth area.

Although the process of the present invention has been described in terms of melting aluminum or aluminum alloys, the process is useful for many metals. Moreover, it is obvious that various modifications and improvements can be made to the present invention without departing from the spirit of the invention and the scope of the appended claims.

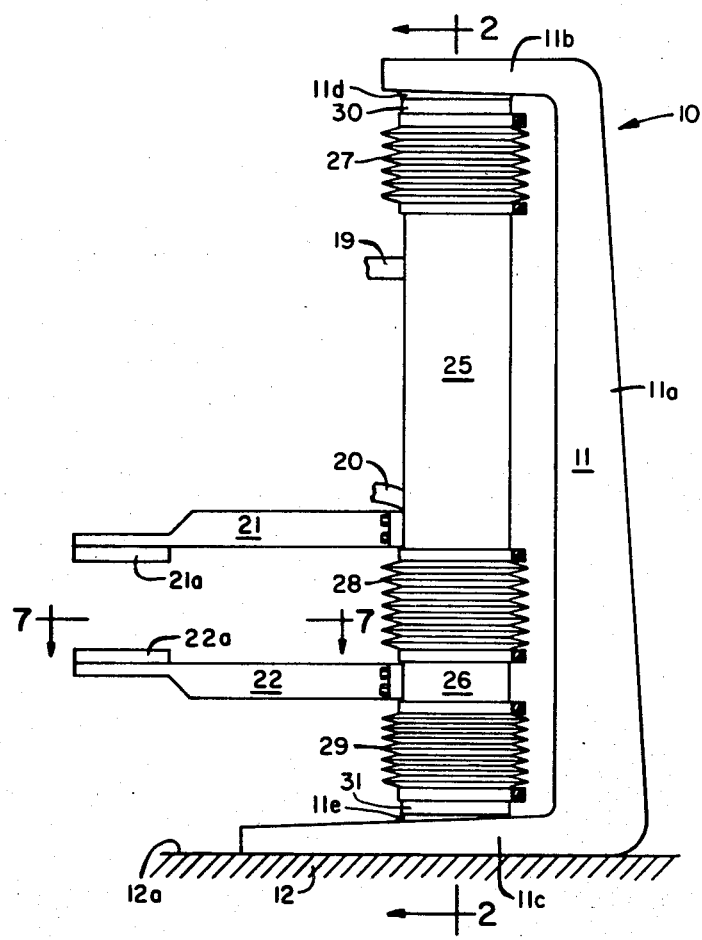

What is claimed is:

1. A system for melting metal comprising in combination
  a. a first chamber provided with a heating means adapted to heat molten metal contained therein;
  b. a second chamber adapted to contain solid metal to be melted;
  c. a molten metal pumping means in fluid communication with said first and second chambers and adapted to pump molten metal from said first chamber to said second chamber;
  d. a first conduit means in fluid communication with said pumping means and said first chamber for recirculating pumped metal back to said first chamber; and
  e. a second conduit means in fluid communication with said first and second chamber for returning molten metal from said second chamber to said first chamber.

2. The system of claim 1 wherein the first conduit means is adapted to recirculate from about 5–50% of the withdrawn molten metal back to the second chamber.

3. The system of claim 1 wherein said first conduit means and said second conduit means are provided with discharge ports into said first chamber which are adjacent one another, whereby molten metal returning through said second conduit means to the first chamber is intimately mixed with molten metal in said first chamber by action of recirculated molten metal from said first conduit means.

* * * * *

United States Patent

Holzer, Jr.

[11] 3,973,764
[45] Aug. 10, 1976

[54] CLAMPING APPARATUS
[75] Inventor: Carl R. Holzer, Jr., Horseheads, N.Y.
[73] Assignee: Corning Glass Works, Corning, N.Y.
[22] Filed: Aug. 8, 1975
[21] Appl. No.: 602,926

[52] U.S. Cl. ............................. 269/26; 269/46
[51] Int. Cl.² ................................... B23Q 3/00
[58] Field of Search ..................... 269/26, 25, 46

[56] References Cited
UNITED STATES PATENTS

| | | | |
|---|---|---|---|
| 1,400,801 | 12/1921 | Cohen | 269/25 |
| 2,354,794 | 8/1944 | Buehler | 269/25 |
| 2,423,249 | 7/1947 | Minton et al. | 269/46 |
| 3,145,022 | 8/1964 | Moll | 269/25 |

*Primary Examiner*—Al Lawrence Smith
*Assistant Examiner*—Robert C. Watson
*Attorney, Agent, or Firm*—Charles W. Gregg; Burton R. Turner; Clarence R. Patty, Jr.

[57] ABSTRACT

Apparatus for clamping a length of a brittle material in preparation for severing thereof into shorter lengths without chipping thereof towards the end of such severing. A pair of bifurcated clamps or clamping members are correspondingly actuated toward each other by a pressurized fluid cylinder and associated piston rod, such cylinder being attached to a clamp support member to which one of the clamps is attached and the otherwise free end of the piston rod being attached to a second clamp support member to which the other of the clamps is attached. A pair of coil springs supports the clamp suppprt members in a vertically floating manner, such clamp support members slidably surrounding guide shafts for vertical alignment of the support members and the attached clamps.

6 Claims, 7 Drawing Figures